Patented July 5, 1932

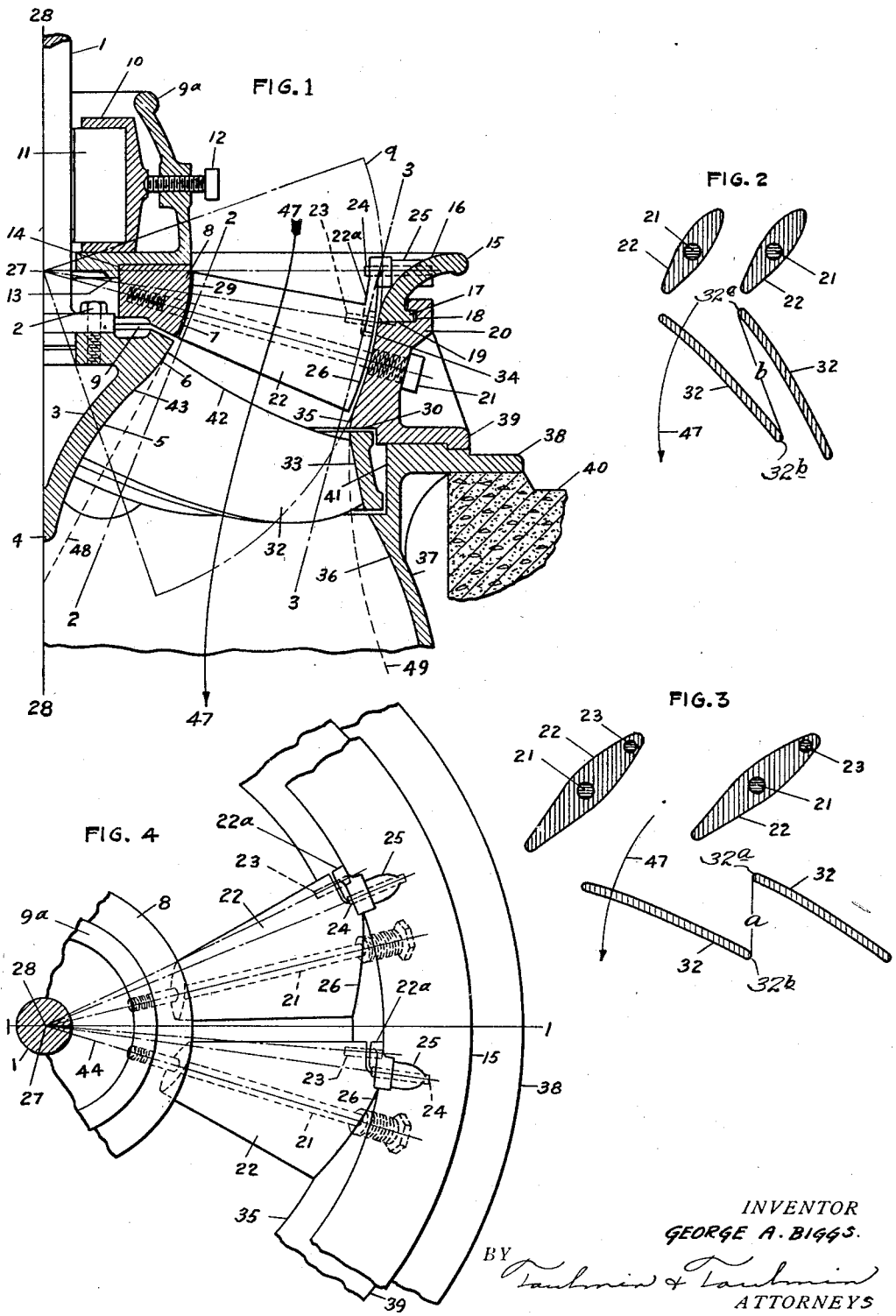

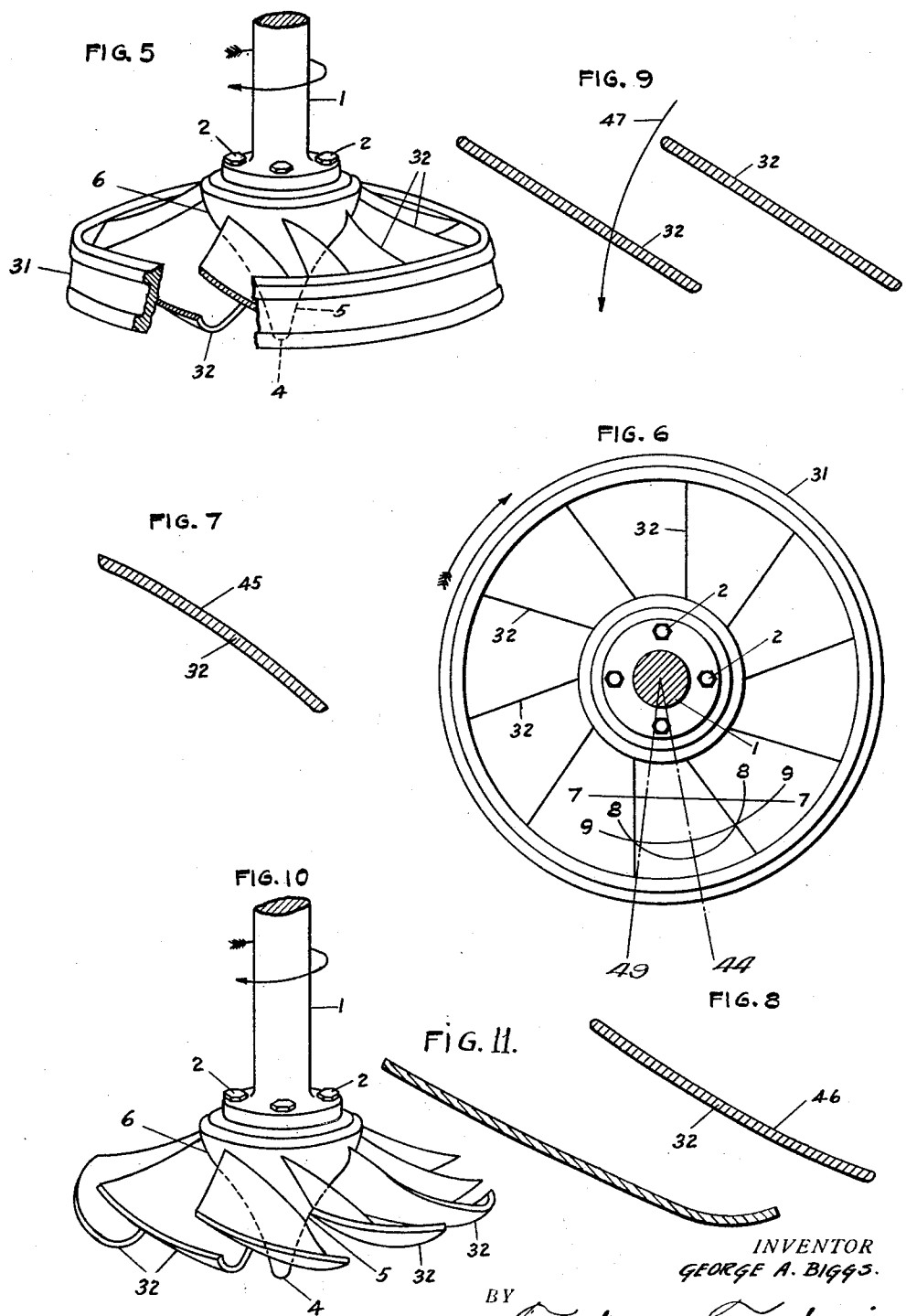

1,865,503

UNITED STATES PATENT OFFICE

GEORGE A. BIGGS, OF SPRINGFIELD, OHIO, ASSIGNOR TO THE JAMES LEFFEL & COMPANY, OF SPRINGFIELD, OHIO, A CORPORATION OF OHIO

HYDRAULIC TURBINE

Original application filed January 24, 1929, Serial No. 334,800. Divided and this application filed July 22, 1929. Serial No. 379,901.

My invention relates to hydraulic turbines and is a division of my application Serial No. 334,800, filed January 24, 1929. The present application is directed to a hydraulic turbine, while application Ser. No. 334,800 is directed to the blades that form part of the runner.

It is the object of my invention to provide a hydraulic turbine that can be adapted to high or medium specific speed characteristics by selecting suitable runner vane angles.

It is a further object to provide a turbine of less weight for a given amount of power or head without sacrifice of strength.

It is my object to provide a turbine in which the fluid flows in a substantially axial direction.

It is my object to provide a turbine which can be adapted to high speed conditions in which the space between the runner vanes and the gates is decreased.

It is a further object to provide a turbine which can be adapted to high specific speeds in which the fluid discharges from the gates and enters the runner vanes without making any appreciable change in direction of flow in the bladeless space between said gates and said runner vanes.

It is a further object to provide a turbine in which the axes of the gates, the axes of the link pins in the gates and the axes of the link pins in the gate operated ring intersect the axis of the turbine at the same point regardless of the degree of gate opening.

It is my object to provide a turbine having wicket gates and high speed characteristics which can be adapted to a flume of smaller dimensions than for a turbine in which the fluid passes between the gates in a substantially radial direction.

It is the object of my invention to provide a turbine of high specific speed characteristics having wicket type of gates in which the fluid flows with less change in direction than in a turbine in which the fluid flowing between the gates is in a substantially radial direction.

It is an object to provide a turbine of high specific speed characteristics having wicket gates in which the fluid is directed to the central part of the runner more effectively, particularly at partial gate openings.

It is an object to provide a turbine having wicket gates in which the fluid is not affected by centrifugal force while it is entering the turbine as in the case where the fluid flows between the gates having axes parallel with the axes of the turbine.

It is an object to provide a turbine in which the axes of the gates are inclined at an angle to the axis of the turbine.

It is a further object to eliminate the use of turbines of high speed characteristics in which the fluid turns at an angle at substantially ninety degrees in a bladeless space between the axes of the gates and the entrance to the runner vanes and to provide instead a true axial flow turbine where the flow is axial before it enters the gates.

It is a further object to eliminate the necessity for using turbines of high speed characteristics in which the fluid flows between the gates in a substantially radial direction.

It is an additional object to eliminate turbines of high speed characteristics in which the axes of the gates are parallel with the axis of the turbine because in such turbines it is necessary to first gate the water and then to provide means of converting the direction of the water, whereas, by my invention, I eliminate any change of direction of the water after it has been gated.

It is a further object to provide a hub, a runner curvature and draft tube design so as to provide for Venturi action in order that the runner speed may be greater than the water speed.

It is a further object to provide a runner bucket of such character that when a section is taken on a straight line through the bucket at an angle to a radial line from the runner axis the bucket will be convex on top and concave on the bottom and, when the same bucket is cut by a cylindrical plane, the axis of which is parallel to but not coincident with the runner axis, the section will be concave on top and convex on the bottom.

Referring to the drawings:

Figure 1 is a vertical section through the turbine on the line 1—1 of Figure 4;

Figure 2 is a section on the line 2—2 of Figure 1;

Figure 3 is a section on the line 3—3 of Figure 1;

Figure 4 is a plan view of Figure 1;

Figure 5 is a side elevation of the completed runner;

Figure 6 is a plan view of the completed runner;

Figure 7 is a section on the line 7—7 of Figure 6 being a section taken on a flat plane at an angle to a line radial from the center of the runner.

Figure 8 is a section on the line 8—8 of Figure 6; being a section on the curved plane described about an axis which is parallel to but not coincident with the runner axis; and Figure 9 shows a section on the line 9—9 of Figure 6, concentric and coincident with the runner axis;

Figure 10 is a runner in elevation without a shroud.

Figure 11 is a section on the bucket axis on the line 44—44.

Referring to the drawings in detail, 1 is a runner shaft to which is connected by bolts 2 a downwardly tapering hub 3 which terminates in a point 4. This hub when viewed on a vertical section is concave at 5. The concavity reverses and becomes convexity at the top of the hub as at 6 where it is streamlined to conform to the convex surface 7 of the inner gate ring 8. This inner gate ring is slightly spaced by the space 9 on its lower face from the upper face of the hub. The inner gate ring supports the bearing collar 9 which carries the adjustable bearing block cages 10 which in turn support the bearing blocks 11. These blocks and their cages are adjusted by the screws 12 which are carried in the bearing housing $9^a$. Shoulders 13 on the lower horizontal wall of the bearing housing engage corresponding inner shoulders of the inner gate ring as at 14 so that the thrust will be taken in that direction.

The outer gate ring 15, which has the arcuate streamlined face 16, terminates in an inwardly-disposed annular shoulder 17 which enters a groove 18 and rests upon the face 19 of the foundation ring 20. This foundation ring 20 supports the outer ends of the gate rods 21 on which are mounted pivotally the gates 22, the inner ends of such rods being mounted in fixed position in the inner gate ring 8. These gates are rotated on the rods 21 by the crank arms 22a which are pivotally connected at 23 to one margin of each of the gates at one end and at the other end are pivotally mounted on the stub shaft 24 which is disposed horizontally in the sleeve 25 that serves as a supporting sleeve projected radially inwardly from the outer gate ring 15.

The rotation of the ring 15 may be effected in any desired means by the customary governor or otherwise or the ring may be set for a given angularity of the gates 22 when the turbine is initially adjusted for operation under the predetermined head of water.

The outer ends of the gates as at 26 are rounded to conform to a curve indicated by the line $q$ which is an arc of a circle whose center lies in the axis of the turbine as indicated at 27. The runner axis is designated as the line 28—28. The inner gate ring surface 7 and the inner ends of the gates as at 29 are also curved, their curvature being described on an arc whose center is at 27.

Thus, by this arrangement it does not matter in what direction the gates are rotated, the ends of the gates will always be equidistant from the surface of the foundation ring 20 or of the inner gate ring 8.

It will also be noted that the axes of the shafts 24 and of the gate pins 21 and of the pivot pins 23, all intersect the same point 27 in the axis of the turbine. This is true no matter whether the gate ring is moved in either direction. By making the axis of the gate bolt 21 intersect at this same point it does not matter to what position the gates are turned on the gate bolts 21 as the axes of the pins 23 always intersect at the same point in the axis of the turbine. By having these three axes intersect at the same point 27 in the axis of the turbine, I can then use the link 22a which will work freely in any position of the gate opening without any tendency to bind.

The reason for having the gate bolts 21 inclined to the axis of the turbine with the inner end of the bolts at a higher elevation than the outer ends is that it provides a more substantial support for the inner gate ring 8 which is subject to forces acting downwardly due to the pressure of the fluid on the gates and against the ring 8 itself. This downward force has a tendency to set up a compression stress in the bolts 21 thereby transmitting the stresses to the foundation ring 20.

The foundation ring 20 is provided with a recessed shoulder portion 30 for receiving the shroud 31 of the runner buckets 32 so that the inside downwardly and outwardly disposed surface 33 of this shroud will be flush with the surface of the foundation ring 20 which is curved at 34 about the axis 27 and reverses its curvature at 35 to conform to the curvature 33 of the shroud 31 in order to permit an expanded area in the draft tube as indicated by the draft tube face 36. This draft tube face 36 has the inner face of the draft tube 37 which is suspended on the annular plate 38 that supports the foundation ring base 39 and in turn rests upon the concrete foundation 40. This draft tube 37 is cut away at 41 to receive the lower portion of the shroud 31 carried on the runner buckets. The leading edge of each bucket extends from the hub laterally and downwardly at an angle to the axis of the runner shaft, and the discharge or trailing edge proceeds laterally and downwardly from the hub at an angle to the axis of the hub but its angularity to said axis is more than the angularity of the leading edge.

It will be noted that the inner gate ring and the foundation ring form a throat of a Venturi structure, the lower walls of which are formed in an expanding chamber by the runner hub surfaces, the inner surface of the shroud ring and the draft tube inner surface 36 so that the water may have a larger area for its departure, thus setting up a suction action permitting high speed of the runner as compared with water speed.

Referring to the runners specifically, 42 designates the runner leading edge. The line of juncture as at 43 of the runner bucket with the hub is convex on top. A non meridian section taken on the line 7—7 of Figure 6 on a plane at an angle to a radial line, such as 44, Figure 4 directed from the runner axis 28 will show an upper convex surface designated 45. The line 7—7 is a section line or a line in which a plane intersects the runner bucket at an angle to either a radial line or radial plane, such as the line 44. This section will be convex on top at any angle from 90 degrees to approximately thirty degrees between the line 7—7 and the line 44—44. Beyond thirty degrees the convexity begins to flatten out until it is scarcely visible, approximating zero as the line 7—7 more nearly approaches coinciding with the line 44—44. The line 44—44 is substantially straight throughout the greater part of the length of the bucket.

An arcuate section taken on the surface of a cylinder whose axis is parallel to the axis 28 but not coincident with it as on the line 8—8 will be concave on top of the runner bucket as at 46. Thus, we have reverse curvature of these buckets.

It will be understood that the buckets overlap and form cells therebetween as shown in Figures 2 and 3 which are sections on the line 2—2 and 3—3 of Figure 1 and indicate the overlapping of the runner buckets for the purpose of forming such cells.

It will be understood that the use of the shroud 31 is optional. In the event that it is not used the draft tube is streamlined to take the place of the shroud. If the shroud is used it may vary in form and dimensions.

It should be noted that the gates 22 are tapered in section. The outer ends are broad and the inner ends are narrow. This results in less weight being necessary in the gate structure.

It has been customary to extend the top plate of the gate casing outward to a point approximating the outer edge of the plate 38 so as to support the upper ends of the gates but, by my structure, I eliminate this and thereby do away with one of the heaviest parts of the hydraulic turbine construction.

It will be noted that the direction of flow of the liquid is substantially axial as indicated by the line 47—47. There are no right angle bends or other radial changes in the direction of flow. In order to obtain high efficiency in a turbine, it is always desirable to have the flow lines smooth and without abrupt bends. This has been accomplished to a high degree in my present invention as will be observed from an examination of the flow lines 47—47, the arc $q$ and the lines 48 and 49. The distance $a$ between the leading edge 32$a$ and the trailing edge 32$b$ is a lesser distance than the distance $b$ as shown in Figure 2 between the same edges adjacent the hub. The line 49—49 indicates a typical radial line, while the line 44—44 indicates the bucket axis shown in Figure 11.

My turbine permits of a variety of specific speeds, either high, medium or low, without the necessity of changing the gates or other supporting and operating members. To design my turbine for a particular specific speed, the only considerations are the matters of selecting the proper inlet and discharge angles of the runner buckets which can be done in a very satisfactory manner without departing materially from the general outlines of the runner.

One of the principal objections to turbines of high specific speed is the large space between the discharge edges of the gates and the inlet edges of the runner buckets. In some of the most efficient designs in the present state of the art, it is necessary for the fluid to make a turn of 90 degrees in this vaneless space. In my invention, it will be noted that the space between the discharge edge of the gates and the inlet edge of the runner vanes is reduced to such an extent that the space is very narrow so that the fluid in passing from the gates to the runner has substantially no change in direction. Thus, the fluid is actually directed by means of the gates substantially directly into the runner. The conditions prevailing in the art heretofore of requiring the fluid to flow a long distance after it leaves the gates and enters the runner are eliminated, thus eliminating water which necessarily is in an unguided state and, therefore, more or less turbulent as it enters the runner. In my invention, the water enters directly from above into the runner whereas heretofore in the art the water entered from sides or radially.

Consequently, more room in previous constructions had to be provided between the sides of the turbine and the flume in which the turbine is installed in order to permit the water to enter the wheel freely. Thus, I am enabled to construct a flume smaller in size and at a lower cost.

In turbines where the fluid enters the turbine gates in a direction more or less radially to the axis of the runner, there is a distinct result of the fluid crowding away from the axis in a centrifugal manner.

At reduced stages of gate opening, this is very undesirable because the major portion of the fluid passes through the outer part of the runner and leaves the central part with reduced or ineffective pressure. This is due largely to the reason that the discharge ends of the gates are so far away from the inlet edges of the runner vanes in the center portion of the runner that the gates do not function satisfactorily in directing the fluid to the central portion.

In my invention, it will be noted that this difficulty is eliminated in that the inner end of the gate and the inner or central portion of the runner are closely adjacent so that the fluid is actually directed into the central portion of the runner by the gates themselves.

This will be seen by comparing the areas in the gates and the runner between the lines 22 and 33 in Figure 1.

Heretofore, the fluid flows around in a somewhat spiral direction, which permits of the fluid being affected by centrifugal force. By the construction of my invention, the fluid is directed into the turbine from above in a straight line and is practically free from a spiral movement around the axis of the turbine thereby eliminating the tendency of the fluid to be thrown outwardly to the outer portion of the runner by centrifugal force. This tendency is greatly reduced, if not entirely eliminated. Thus, I secure higher efficiency at reduced stages of gate opening.

The turbine as covered by this description can be built as either a high or low specific speed type. By "high specific speed" I mean a high number of turns of the turbine runner and shaft in a given period of time for the amount of power developed. A convenient way of expressing this mathematically is according to the result obtained by applying the formula in which H. P. is the horse power developed. R. P. M. is the number of turns expressed in revolutions per minute, and H is the head of water measured in feet acting on the turbine to develop the aforesaid power and speed, raised to the 1¼ power of the number.

If the result of applying this formula to the H. P., speed and head on the turbine is 120 or more, then the turbine is what I designate as being of high specific speed. The different specific speeds are obtained by making the inclination of the inlet and discharge edges of the runner vanes the proper angle in relation to the axis of the turbine.

In high specific speed designs these angles are flatter in relation to a plane at right angles to the axis of the turbine than in low speed designs. The degree of angularity at the inlet and outlet of the vanes can be established to suit the R. P. M. and H. P. desired in accordance with prevailing practice.

It will be understood that I desire to comprehend within my invention such modifications as may be necessary to adapt it to varying conditions and uses.

Having thus fully described my invention, what I claim as new and desire to secure by Letters Patent, is:

1. In a hydraulic turbine, a runner hub and a plurality of buckets of such curvature that a section through any bucket on a plane at an angle from 90 degrees to 30 degrees to a radial line from the runner axis will be convex on top and a section on the surface of the cylinder whose axis is parallel to the runner axis will be concave on top of the runner, and gate means the longitudinal axis of which is substantially parallel to the longitudinal axis of the runner buckets.

2. In a hydraulic turbine, a runner hub and a plurality of buckets of such curvature that a section through any bucket on a plane at an angle from 90 degrees to 30 degrees to a radial line from the runner axis will be convex on top and a section on the surface of the cylinder whose axis is parallel to the runner axis will be concave on top of the runner, the bottom of said runner on such sections being concave on the bottom in the first instance and convex on the bottom in the second instance, and gate means the longitudinal axis of which is substantially parallel to the longitudinal axis of the runner buckets.

3. In a hydraulic turbine, a runner having a hub, a plurality of overlapping buckets, such buckets being of a curvature that a section through any bucket on a straight line at an angle from 90 degrees to 30 degrees to a radial line from the runner axis will be convex on top and concave on the bottom of the bucket and a section on the surface of a cylinder whose axis is parallel with the runner axis will be concave on top of the bucket and convex on the bottom, and gate means the longitudinal axis of which is substantially parallel to the longitudinal axis of the runner buckets.

4. In a hydraulic turbine, a tapered hub of a runner, a plurality of radially-disposed buckets having their major axes curved downwardly and outwardly, the transverse curvature and longitudinal curvature of the buckets being otherwise expressed than when a section through any bucket on a straight line at an angle from 90 degrees to 30 degrees to a radius from the runner axis is taken the section will be convex on top and concave on the bottom and when a section is taken on the surface of a cylinder whose axis is parallel to the runner axis the section will be concave on top and convex on the bottom, and gate means the longitudinal axis of which is substantially parallel to the longitudinal axis of the runner buckets.

5. In a hydraulic turbine, a runner having a hub and a plurality of buckets, such buckets being of such curvature that sections on straight lines disposed at an angle to the runner axis and substantially parallel to the line of water flow over the buckets will always be convex on top and concave on bottom, and gate means the longitudinal axis of which is substantially parallel to the longitudinal axis of the runner buckets.

6. In a hydraulic turbine, a runner having a hub and a plurality of buckets, such buckets being of such curvature that sections on straight lines disposed at an angle to the runner axis and substantially parallel to the line of water flow over the buckets will always be convex on top and concave on bottom, the section taken nearer the hub indicating buckets of greater angularity than the section adjacent the periphery of the buckets, the angularity of said buckets with respect to one another from the hub to the periphery being progressively less, and gate means the longitudinal axis of which is substantially parallel to the longitudinal axis of the runner buckets.

7. In a hydraulic turbine, a runner having a hub and a plurality of buckets, such buckets being of such curvature that sections on straight lines disposed at an angle to the runner axis and substantially parallel to the line of water flow over the buckets will always be convex on top and concave on the bottom, the section taken nearer the hub in indicating buckets of greater angularity than the section adjacent the periphery of the buckets, and gate means the longitudinal axis of which is substantially parallel to the longitudinal axis of the runner buckets.

8. In a hydraulic turbine, a runner having a hub and a plurality of buckets, such buckets being of such curvature that sections on straight lines disposed at an angle to the runner axis and substantially parallel to the line of water flow over the buckets will always be convex on top and concave on the bottom, the section taken nearer the hub indicating buckets of greater angularity than the section adjacent the periphery of the buckets, the angularity of said buckets with respect to one another from the hub to the periphery being progressively less and the space between the leading edges of the trailing edges being greater between the leading edges adjacent the hub, and gate means the longitudinal axis of which is substantially parallel to the longitudinal axis of the runner buckets.

9. In a runner, a tapered hub, a plurality of overlapping buckets whose longitudinal axes are curved downwardly and outwardly, said buckets having water cells there-between and of such curvature that sections through any bucket on lines at an angle to the runner axes parallel to the line of flow will always be convex on top and concave on the bottom while a section on a straight line at an angle from 90 degrees to 30 degrees to a radial line from the runner axes will likewise be convex on top and concave on the bottom, and gate means, the longitudinal axes of which is substantially parallel to the longitudinal axis of the runner buckets.

10. In a runner, a tapered hub, a plurality of overlapping buckets whose longitudinal axes are curved downwardly and outwardly, said buckets having water cells therebetween and of such curvature that sections through any bucket on lines at an angle to the runner axes parallel to the line of flow will always be convex on top and concave on the bottom while a section on a straight line at an angle from 90 degrees to 30 degrees to a radial line from the runner axes will likewise be convex on top and concave on the bottom, and a section on the surface of a cylinder whose axis is parallel to but removed from the runner axis will be concave on top and convex on the bottom, and gate means the longitudinal axis of which is substantially parallel to the longitudinal axis of the runner buckets.

11. In a runner, a tapered hub, a plurality of radially disposed buckets, the line of juncture of which with said hub is convex on the top and concave on the bottom and the longitudinal axis of which is slightly curved downwardly and outwardly, and gate means the longitudinal axis of which is substantially parallel to the longitudinal axis of the runner buckets.

12. In a runner, a tapered hub, a plurality of radially disposed buckets, the line of juncture of which with said hub is convex on the top and concave on the bottom and the longitudinal axis of which is slightly curved downwardly and outwardly, such buckets being of such curvature that a section on a plane at an angle from 90 degrees to 30 degrees to a radial line from the runner axis will be convex on top and concave on the bottom and a section on the surface of a cylinder whose axis is parallel to but removed from the runner axis will be concave on top and convex on the bottom, and gate means the longitudinal axis of which is substantially parallel to the longitudinal axis of the runner buckets.

13. In a turbine runner, a tapered hub and a plurality of runner buckets, the line of juncture of such buckets with the hub being convex on the top and concave on the bottom and the buckets being of such curvature that a plane at an angle from 90 degrees to 30 degrees to the radial line from the runner axis will cut a section that is convex on top of the bucket and concave on the bottom and a section on a cylindrical surface, the center of which is parallel to but removed from the runner axis will be concave on top and convex on the bottom, and gate means the longitudinal axis of which is substantially parallel to the longitudinal axis of the runner buckets.

14. In a turbine runner, a tapered hub and a plurality of runner buckets, the line of juncture of such buckets with the hub being convex on the top and concave on the bottom and the buckets being of such curvature that a plane at an angle from 90 degrees to 30 degrees to the radial line from the runner axis will cut a section that is convex on top of the bucket and concave on the bottom and a section on a cylindrical surface, the center of which is parallel to but removed from the runner axis will be concave on top and convex on the bottom, such buckets being arranged to at least partially overlap to form water cells therebetween, and gate means the longitudinal axis of which is substantially parallel to the longitudinal axis of the runner buckets.

15. In a hydraulic turbine runner, a hub and a plurality of radially disposed buckets of such curvature that a section on a plane at an angle from 90 degrees to 30 degrees to a radial line from the runner axis will be convex on top and concave on the bottom, a section on a cylindrical surface described about an axis parallel to but removed from the runner axis will be concave on top and convex on the bottom, and a section on a cylindrical surface, the center of which is both parallel and coincident with the runner axis will be a straight line on both the top and bottom of the runner bucket, and gate means the longitudinal axis of which is substantially parallel to the longitudinal axis of the runner buckets.

16. In a hydraulic turbine, a runner having a hub and a plurality of buckets, said buckets being of such curvature that a section on a straight line at an angle from 90 degrees to 30 degrees to a radial line from the runner axis will be convex on top and concave on the bottom and a section on a cylindrical surface whose axis of description coincides with and is parallel to the runner axis will be a straight line on the top and bottom of the bucket, and gate means the longitudinal axis of which is substantially parallel to the longitudinal axis of the runner buckets.

17. In a runner of a hydraulic turbine, the combination of a hub and a plurality of buckets, such buckets being of such a curvature that a section on a cylindrical surface whose axis is parallel but removed from the runner axis will be concave on top and convex on the bottom while a section on a cylindrical surface whose axis is both coincident with and parallel to the runner axis will be a straight line on the top and bottom, and gate means the longitudinal axis of which is substantially parallel to the longitudinal axis of the runner buckets.

18. In a hydraulic turbine, a runner hub and a plurality of buckets of such curvature that a section on a plane at an angle from 90 degrees to 30 degrees to a radial line from the runner axis will be convex on top and a section on the surface of the cylinder whose axis is parallel to but removed from the runner axis will be concave on top of the runner, and gate means the longitudinal axis of which is substantially parallel to the longitudinal axis of the runner buckets, the outlet edge of said gates being closely adjacent to and substantially parallel with the inlet edges of the runner buckets.

19. In a hydraulic turbine, a runner hub and a plurality of buckets of such curvature that a section on a plane at an angle from 90 degrees to 30 degrees to a radial line from the runner axis will be convex on top and a section on the surface of the cylinder whose axis is parallel to but removed from the runner axis will be concave on top of the runner, the bottom of said runner on such sections being concave on the bottom in the first instance and convex on the bottom in the second instance, and gate means the longitudinal axis of which is substantially parallel to the longitudinal axis of the runner buckets, the outlet edge of said gates being closely adjacent to and substantially parallel with the inlet edges of the runner buckets.

20. In a hydraulic turbine, a runner having a hub, a plurality of overlapping buckets, such buckets being of a curvature that a section on a straight line at an angle from 90 degrees to 30 degrees to a radial line from the runner axis will be convex on top and concave on the bottom of the bucket and a section on the surface of a cylinder whose axis is parallel with the runner axis will be concave on top of the bucket and convex on the bottom, and gate means the longitudinal axis of which is substantially parallel to the longitudinal axis of the runner buckets, the outlet edge of said gates being closely adjacent to and substantially parallel with the inlet edges of the runner buckets.

21. In a hydraulic turbine, a tapered hub of a runner, a plurality of radially-disposed buckets having their major axes curved downwardly and outwardly, the transverse curvature and longitudinal curvature of the buckets being otherwise expressed than when a section on a straight line at an angle from 90 degrees to 30 degrees to a radius from the runner axis is taken the section will be convex on top and concave on the bottom and when a section is taken on the surface of a cylinder whose axis is parallel to the runner axis the section will be concave on top and convex on the bottom, and gate means the longitudinal axis of which is substantially parallel to the longitudinal axis of the runner buckets, the outlet edge of said gates being closely adjacent to and substantially parallel with the inlet edges of the runner buckets.

22. In a hydraulic turbine, a runner having a hub and a plurality of buckets, such buckets being of such curvature that sections on straight lines disposed at an angle from 90 degrees to 30 degrees to the runner axis and substantially parallel to the line of water flow over the buckets will always be convex on top and concave on the bottom, and gate means the longitudinal axis of which is substantially parallel to the longitudinal axis of the runner buckets, the outlet edge of said gates being closely adjacent to and substantially parallel with the inlet edges of the runner buckets.

23. In a hydraulic turbine, a runner having a hub and a plurality of buckets, such buckets being of such curvature that sections on straight lines disposed at an angle to the runner axis and substantially parallel to the line of water flow over the buckets will always be convex on top and concave on bottom, the section taken nearer the hub indicating buckets of greater angularity than the section adjacent the periphery of the buckets, the angularity of said buckets with respect to one another from the hub to the periphery being progressively less, and gate means the longitudinal axis of which is substantially parallel to the longitudinal axis of the runner buckets, the outlet edge of said gates being closely adjacent to and substantially parallel with the inlet edges of the runner buckets.

24. In a hydraulic turbine, a runner having a hub and a plurality of buckets, such buckets being of such curvature that sections on straight lines disposed at an angle to the runner axis and substantially parallel to the line of water flow over the buckets will always be convex on top and concave on the bottom, the section taken nearer the hub indicating buckets of greater angularity than the section adjacent the periphery of the buckets, and gate means the longitudinal axis of which is substantially parallel to the longitudinal axis of the runner buckets, the outlet edge of said gates being closely adjacent to and substantially parallel with the inlet edges of the runner buckets.

25. In a hydraulic turbine, a runner having a hub and a plurality of buckets, such buckets being of such curvature that sections on straight lines disposed at an angle to the runner axis and substantially parallel to the line of water flow over the buckets will always be convex on top and concave on the bottom, the section taken nearer the hub indicating buckets of greater angularity than the section adjacent the periphery of the buckets, the angularity of said buckets with respect to one another from the hub to the periphery being progressively less and the space between the leading edges of the trailing edges being greater between the leading edges adjacent the hub, and gate means the longitudinal axis of which is substantially parallel to the longitudinal axis of the runner buckets, the outlet edge of said gates being closely adjacent to and substantially parallel with the inlet edges of the runner buckets.

26. In a runner, a tapered hub, a plurality of overlapping buckets whose longitudinal axes are curved downwardly and outwardly, said buckets having water cells therebetween and of such curvature that sections on lines at an angle to the runner axes parallel to the line of flow will always be convex on top and concave on the bottom while a section on a straight line at an angle from 90 degrees to 30 degrees to a radial line from the runner axes will likewise be convex on top and concave on the bottom, and gates means the longitudinal axis of which is substantially parallel to the longitudinal axes of the runner buckets, the outlet edge of said gates being closely adjacent to and subsantially parallel with the inlet edges of the runner buckets.

27. In a runner, a tapered hub, a plurality of overlapping buckets whose longitudinal axes are curved downwardly and outwardly, said buckets having water cells therebetween and of such curvature that sections on lines at an angle to the runner axes parallel to the line of flow will always be convex on top and concave on the bottom while a section on a straight line at an angle from 90 degrees to 30 degrees to a radial line from the runner axes will likewise be convex on top and concave on the bottom, and a section on the surface of a cylinder whose axis is parallel to the runner axis will be concave on top and convex on the bottom, and gate means the longitudinal axis of which is substantially parallel to the longitudinal axis of the runner buckets, the outlet edge of said gates being closely adjacent to and substantially parallel with the inlet edges of the runner buckets.

28. In a runner, a tapered hub, a plurality of radially disposed buckets, the line of juncture of which with said hub is convex on the top and concave on the bottom and the longitudinal axis of which is slightly curved downwardly and outwardly, and gate means the longitudinal axis of which is substantially parallel to the longitudinal axis of the runner buckets, the outlet edge of said gates being closely adjacent to and substantially parallel with the inlet edges of the runner buckets.

29. In a runner, a tapered hub, a plurality of radially disposed buckets, the line of juncture of which with said hub is convex on the top and concave on the bottom and the longitudinal axis of which is slightly curved downwardly and outwardly, such buckets being of such curvature that a section on a plane at an angle from 90 degrees to 30 degrees to a radial line from the runner axis will be convex on top and concave on the bottom and a section on the surface of a cylinder whose axis is parallel to the runner axis will be concave on top and convex on the bottom, and gate means the longitudinal axis of which is substantially parallel to the longitudinal axis of the runner buckets, the outlet edge of said gates being closely adjacent to and substantially parallel with the inlet edges of the runner buckets.

30. In a turbine runner, a tapered hub and a plurality of runner buckets, the line of juncture of such buckets with the hub being convex on top and concave on the bottom and the buckets being of such curvature that a plane at an angle from 90 degrees to 30 degrees to the radial line from the runner axis will cut a section that is convex on top of the bucket and concave on the bottom and a section on a cylindrical surface, the center of which is parallel to the runner axis will be concave on top and convex on the bottom, and gate means the longitudinal axis of which is substantially parallel to the longitudinal axis of the runner buckets, the outlet edge of said gates being closely adjacent to and substantially parallel with the inlet edges of the runner buckets.

31. In a turbine runner, a tapered hub and a plurality of runner buckets, the line of juncture of such buckets with the hub being convex on the top and concave on the bottom and the buckets being of such curvature that a plane at an angle from 90 degrees to 30 degrees to the radial line from the runner axis will cut a section that is convex on top of the bucket and concave on the bottom and a section on a cylindrical surface, the center of which is parallel to the runner axis will be concave on top and convex on the bottom, such buckets being arranged to at least partially overlap to form water cells therebetween, and gate means the longitudinal axis of which is substantially parallel to the longitudinal axis of the runner buckets, the outlet edge of said gates being closely adjacent to and substantially parallel with the inlet edges of the runner buckets.

32. In a hydraulic turbine runner, a hub and a plurality of radially disposed buckets of such curvature that a section on a plane at an angle from 90 degrees to 30 degrees to a radial line from the runner axis will be convex on top and concave on the bottom, a section on a cylindrical surface described about an axis parallel to the runner axis will be concave on top and convex on the bottom, and a section on a cylindrical surface, the center of which is both parallel and coincident with the runner axis will be a straight line on both the top and bottom of the runner bucket, and gate means the longitudinal axis of which is substantially parallel to the longitudinal axis of the runner buckets, the outlet edge of said gates being closely adjacent to and substantially parallel with the inlet edges of the runner buckets.

33. In a hydraulic turbine, a runner having a hub and a plurality of buckets, said buckets being of such curvature that a section on a straight line at an angle to a radial line from the runner axis will be convex on top and concave on the bottom and a section on a cylindrical surface whose axis of description coincides with and is parallel to the runner axis will be a straight line on the top and bottom of the bucket, and gate means the longitudinal axis of which is substantially parallel to the longitudinal axis of the runner buckets, the outlet edge of said gates being closely adjacent to and substantially parallel with the inlet edges of the runner buckets.

34. In a runner of a hydraulic turbine, the combination of a hub and a plurality of buckets, such buckets being of such a curvature that a section on a cylindrical surface whose axis is parallel the runner axis will be concave on top and convex on the bottom while a section on a cylindrical surface whose axis is both coincident with and parallel to the runner axis will be a straight line on the top and bottom, and gate means the longitudinal axis of which is substantially parallel with the inlet edges of the runner buckets.

35. In a hydraulic turbine, a runner having a shaft and a plurality of buckets, a draft tube, a foundation ring mounted thereon, an inner gate ring mounted above the runner buckets, gates pivotally mounted radially and diagonally between the foundation ring and the inner gate ring, a bearing housing supported by said inner gate ring, bearing members engaging the runner shaft, cages for said bearing members in said housing, gate supporting bolts mounted in said inner gate ring and foundation radially and downwardly whereby the bearing thrust of maintaining the runner shaft in vertical alignment is distributed through the diagonal gate bolts into the foundation ring.

36. In a hydraulic turbine, a runner having a shaft and a plurality of buckets, a draft tube, a foundation ring mounted thereon, an inner gate ring mounted above the runner buckets, gates pivotally mounted radially and diagonally between the foundation and the inner gate rings, a bearing housing supported by said inner gate ring, bearing members engaging the runner shaft, cages in said housing for said bearing members, gate supporting bolts mounted in said inner gate ring and foundation ring radially and downwardly whereby the bearing thrust of maintaining the runner shaft in vertical alignment is distributed through the diagonal gate bolts into the foundation ring, and rotatably mounted outer gate ring on said foundation ring adapted to move without being disturbed by the radial thrust and crank members pivotally mounted thereon at one end and pivotally connected at the other to the gates to adjust the gate positions.

In testimony whereof, I affix my signature.

GEORGE A. BIGGS.